E. C. GRIFFITH.
AUTOMATIC HOG FEEDER.
APPLICATION FILED FEB. 24, 1919.
1,308,901. Patented July 8, 1919.
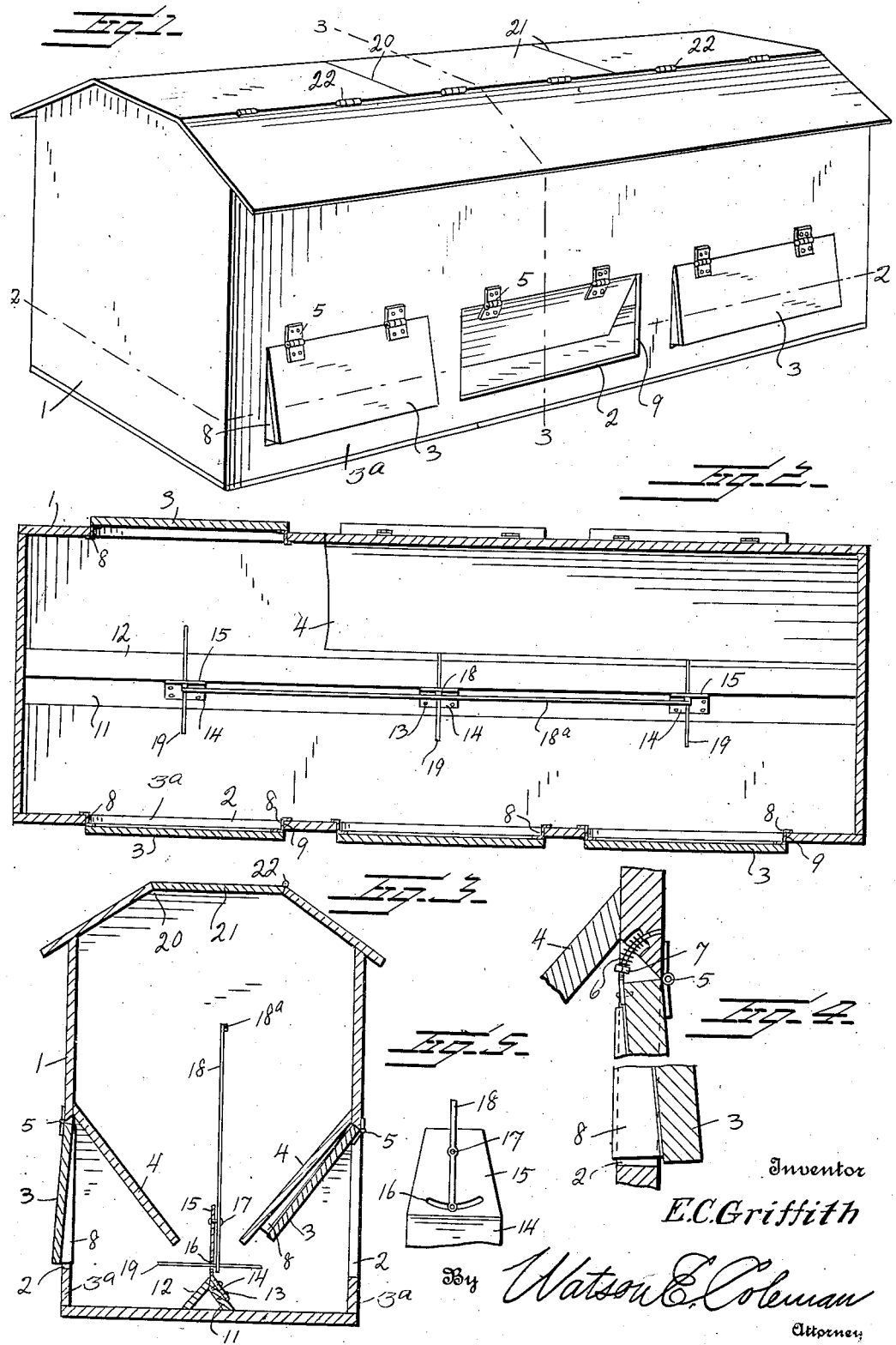

UNITED STATES PATENT OFFICE.

EUCLID C. GRIFFITH, OF SPRINGVILLE, IOWA.

AUTOMATIC HOG-FEEDER.

1,308,901. Specification of Letters Patent. Patented July 8, 1919.

Application filed February 24, 1919. Serial No. 278,685.

*To all whom it may concern:*

Be it known that I, EUCLID C. GRIFFITH, a citizen of the United States, residing at Springville, in the county of Linn and State of Iowa, have invented certain new and useful Improvements in Automatic Hog-Feeders, of which the following is a specification, reference being had to the accompanying drawings.

This invention relates to an improved automatic hog feeder, and the invention aims to provide a feeder of such general character and design, as to afford means involving oppositely suspended doors or closures upon opposite sides of a housing, adapted to be actuated inwardly by the hogs, whereby they may have ready access to the feed.

The invention further makes provision of means for limiting the closures in their inward movement, and means for urging the closures normally outwardly disposed at their lower ends relative to the housing, in combination with means for limiting the closures in their lateral movements.

Obviously the closures are urged outwardly at their lower portions relative to the housing so as to shed the rain, and prevent the same from reaching the interior of the housing through the openings.

Further, the provision of improved means is provided, whereby the hog feed may gravitate downwardly and toward the openings, so that when the closures are pushed inwardly by the hog, the hog may readily partake of the same.

Further, the invention makes provision of means arranged in the housing, to be actuated by the hog, or by a person, to agitate the feed, and cause the same to gravitate toward the openings closed by the closures, it having been discovered that the feed very often becomes clogged, and will not reach a position to be reached by the hog.

While the structure at present disclosed and described is deemed preferable, it is clear that the same is susceptible to changes, in the minor details of construction, and the right to these changes is claimed, provided they are comprehended within the scope of what is claimed.

The invention comprises further features and combination of parts as hereinafter set forth, shown in the drawings and claimed.

In the drawings:

Figure 1 is a view in perspective of the improved hog feeder constructed in accordance with the invention.

Fig. 2 is a horizontal sectional view on line 2—2 of Fig. 1.

Fig. 3 is a vertical sectional view on line 3—3 of Fig. 1.

Fig. 4 is an enlarged detail view of the closure of one of the openings to the interior of the housing, clearly illustrating the means for urging the closure outwardly, and limiting the same in its outward movement.

Fig. 5 is a detail view of one of the upstanding plates 15, showing the feed agitating member.

Referring more especially to the drawings 1 designates a suitable housing, which may be any suitable or desired shape or configuration, and constructed of any suitable material, preferably wood. The longitudinal sides of the housing 1 are provided with openings 2, through which the hogs may have ready access to the feed within the housing. The cleats or boards 3ª at the lower part of the openings rise upwardly from the bottom of the housing and constitute means to prevent the feed from spreading outwardly from the housing, that is to say, through the openings. The hog when eating of the feed in the housing, necessarily reaches its head over the cleat or board, it being necessary for the hog to apply pressure upon either one of the doors or closures 3. Such applied pressure upon the closure or door causes the same to swing inwardly, as shown in full lines in Fig. 3. When the closure swings inwardly, it is to be noted that it abuts against interiorly located beveled abutments 4, thereby limiting the closure in its inward movement. Each closure is hingedly connected to the upper marginal edge of the opening, by means of hinges 5. These hinges 5 are applied upon the outer face of the housing and the closure. Such application of the hinges necessarily causes the closure to automatically swing outwardly at its lower portion beyond the marginal side edges of the opening. This positioning of the closure sheds the rain and prevents the same from reaching the feed on the interior of the housing. In order to facilitate or additionally urge the closure in such outward position, the hinges 5 include means such as shown at 6 for urging pressure upon the closure. However, this additional pressure to keep the closure swung outwardly at its bottom is not great enough to resist the pressure to be applied by the hog, in his attempt to swing the closure inwardly to reach the feed. Also this means for furnishing additional pressure on the closure includes a member 7 to slightly increase or decrease the pressure as the case may be. The opposite side edges of the closure are provided with yieldable elements 8, which engage the marginal side edges 9 of the opening. These elements coöperate slightly frictionally with the edges 9 to limit the closure in its outwardly urged position, hence preventing the wind from blowing the closure inwardly, therefore, obviously, preventing the rain from reaching the feed.

On the interior of the housing upon its bottom, elongated boards 11 are arranged, one inclined from the other, thereby constructing a V-shaped feed deflector 12 by which the feed in the housing is deflected or fed toward the opposite openings of the housing.

Rising upwardly from and bolted or otherwise secured to this central deflector as at 13 is an angularly extending portion 14 of an upstanding plate 15. This plate has an elongated slot 16, and fulcrumed upon a bolt 17 in the upper part of this plate 14 is a rod 18 adapted to be oscillated. Carried by the lower end of the rod 18 is a transversely disposed elongated rod 19. This rod 19 is fastened to the rod 18 at a point substantially midway its end, therefore one of its arms protrudes through the slot 16, and either end thereof may be engaged by the nose of the hog whereby the upper end of the rod 18 may agitate the feed. The upper ends of the rods 18 are connected by a longitudinally extending rod 18ª, whereby, when one end or the other of one of the rods 19 is engaged by the nose of the hog, all of the rods 18 may be oscillated simultaneously for agitating the feed. Obviously the upper portion of the rod 18 may be manipulated by a person, so that the feed in the housing may be thoroughly agitated, whereby it will become dislodged and feed toward the openings, in order to be reached by the hog, when the closures are swung inwardly by the hog. The upper part of the housing is provided with an additional opening 20, there being covers or lids 21 hinged at 22, for closing the opening 20. The feed is deposited in the housing through the opening 20.

While the specification and drawings illustrate a plurality of door openings, and closures or doors therefor, it is obvious that each side of the hog feeder may be provided with a single door opening, including a single door or closure. In other words, it is the aim that the structure is not to be limited to any particular number of doors.

The invention having been set forth, what is claimed as new and useful is:

1. In a hog feeder, the combination with feed receiving housing provided with openings in its side wall allowing access to the feed, the bottom of the housing having feed urging means to urge the feed toward the openings, of an animal actuated one-piece oscillatory feed agitator swingingly rising upwardly from the feed urging means and having its upper part extending into the feed above said urging means, said upper part of the agitator being adapted to swing in a direction longitudinally with the urging means for agitating the feed, whereby it may be urged by the feed urging means.

2. In a hog feeder, the combination with a feed receiving housing provided with openings in its side walls allowing access to the feed, the bottom of the housing having feed urging means to urge the feed toward the openings of an animal actuated feed agitator mounted on the feed urging means, for agitating the feed, whereby it may be urged by the feed urging means, said animal actuated agitating means comprising an upstanding plate provided with an elongated slot near its lower part, and a rod fulcrumed on the plate and having a second rod carried by its lower end and extending transversely and having one arm protruding through the slot.

3. In a hog feeder, the combination with a feed receiving housing having in its side wall an opening allowing access to the feed, of a closure hinged to the upper edge of the opening and adapted to swing inwardly under the influence of the pressure exerted by an animal, an abutment member inclined downwardly and inwardly from the upper edge of the opening to limit the closure in its inward movement, the upper edge portion of the opening having an aperture curved concentric with the hinge of the closure, one end of the aperture having a countersink, a rod fixed to the closure and having a portion curved concentrically with the hinge of the closure and engaging through said aperture, a member adjustable on the rod, and a spring interposed between the member and the bottom of the countersink, acting to urge the closure outwardly, when it is in its downward position.

4. In a hog feeder, the combination with a feed receiving housing having in its side wall an opening allowing access to the feed, a closure hinged to the upper edge of the opening and adapted to swing inwardly under the influence of the pressure exerted by an animal, an abutment member inclined downwardly and inwardly from the upper edge of the opening to limit the closure in its inward movement, the upper edge portion of the opening having an aperture curved concentric with the hinge of the closure, one end of the aperture having a countersink, a rod fixed to the closure and having a portion curved concentrically with the hinge of the closure and engaging through said aperture, a member adjustable on the rod, and a spring interposed between the member and the bottom of the countersink, acting to urge the closure outwardly, when it is in its downward position, and means on the opposite vertical edges of the closure engaging and overlying the opposite vertical edges of the opening, and performing the double fold purpose of limiting the closure in its outward movement, and closing the space between the opposite vertical edges of the closure and the vertical edges of the openings.

5. In a hog feeder, the combination with a feed receiving housing provided with openings in its opposite side walls allowing access to the feed, the bottom of the housing having means to urge the feed toward the openings, of a support rising upwardly from the feed urging means, a one piece oscillatory agitator mounted on the support and having its upper end projected upwardly through the feed, and means carried by the lower end of the agitator to be engaged by the nose of the animal from the opening of either side of the housing, for oscillating the agitator, whereby its upper part will swing in a direction longitudinally with the urging means, whereby the feed may be urged by the feed urging means.

6. In a hog feeder, the combination with a feed receiving housing provided with openings in its opposite side walls allowing access to the feed, the bottom of the housing having means to urge the feed toward the openings, of a support rising upwardly from the feed urging means, an oscillatory agitator fulcrumed on the support and provided with a long and short arm, the long arm extending upwardly through the feed to agitate the same, the support having an arcuate slot concentric with the pivot of the agitator, and means carried by the lower end of the short arm and engaging through the slot, whereby it may be engaged by the nose of an animal through the opening of either side of the housing.

7. In a hog feeder, the combination with a feed receiving housing, the opposite side walls of which having a plurality of openings allowing access to the feed, the openings of one side being opposite the openings of the other side, the bottom of the housing having means to urge the feed toward the openings, of a plurality of supports rising upwardly from the feed urging means in positions adjacent to and between the opposite openings and provided with arcuate slots, a plurality of agitators, each pivoted on a support concentric with the arcuate slot, the lower end of each agitator having a transverse member protruding through the slot, whereby either end may be engaged by the nose of an animal to oscillate the agitator, and a connecting rod connecting the upper ends of said agitators, whereby, when either one of the transverse members is engaged by the nose of an animal, the agitators will be oscillated in unison.

8. In a hog feeder, the combination with a feed receiving housing, the opposite sides of the housing having a plurality of openings opposite each other, the bottom of the housing having means to urge the feed toward the openings, a plurality of agitators mounted on the feed urging means to swing in a direction longitudinally with the urging means, the lower ends of the agitators having members between the opposite openings, so that either end may be engaged by the nose of an animal to impart movement to the agitator, and means interconnecting the upper ends of the agitators, whereby the actuation of one agitator will impart movement to the others, whereby all the agitators may operate in unison.

9. In a hog feeder, the combination with a feed receiving housing having in its side wall an opening allowing access to the feed, of a closure for the opening, means on the outside of the closure and the outer surface of the wall for hinging the closure to the upper edge portion of the opening, whereby the closure when in its downward position will automatically urge outwardly, an abutment member inclined downwardly and inwardly from the upper edge of the opening to limit the closure in its inward movement, when so moved under the influence of the pressure exerted by an animal, and means carried by the opposite vertical edges of the closure and overlying the opposite vertical edges of the opening, performing the double function of limiting the closure in its outwardly urged movement and closing the space between the opposite edges of the closure and the opposite vertical edges of the openings, to keep out the moisture.

10. In a hog feeder, the combination with a feed receiving housing having in its side wall an opening allowing access to the feed, of a closure for the opening, means on the outside of the closure and the outer surface of the wall for hinging the closure to the upper edge portion of the opening, whereby the closure when in its downward position will automatically urge outwardly beyond the outer face of the side wall of the feed receiving housing, an abutment member inclined downwardly and inwardly from the upper edge of the opening to limit the closure in its inward movement, when so moved under the influence of the pressure exerted by an animal, and additional means concentric with the first means and coöperating between the upper edges of the closure and the upper edge of the opening, to insure urging the closure outwardly.

11. In a hog feeder, the combination with a feed receiving housing having in its side wall an opening allowing access to the feed, of a closure for the opening, means on the outside of the closure and the outer surface of the wall for hinging the closure to the upper edge portion of the opening, whereby the closure when in its downward position will automatically urge outwardly, an abutment member inclined downwardly and inwardly from the upper edge of the opening to limit the closure in its inward movement, when so moved under the influence of the pressure exerted by an animal, and additional means coöperating between the upper edges of the closure and the upper edge of the opening, to insure urging the closure outwardly, and means carried by the opposite vertical edges of the closure and overlying the opposite vertical edges of the opening, performing the double function of limiting the closure in its outwardly urged movement and closing the space between the opposite edges of the closure and the opposite vertical edges of the openings, to keep out the moisture.

In testimony whereof I hereunto affix my signature in the presence of two witnesses.

EUCLID C. GRIFFITH.

Witnesses:
  C. R. BIDDICK,
  LILLIAN A. DYRLAND.